United States Patent Office 3,280,633
Patented Oct. 25, 1966

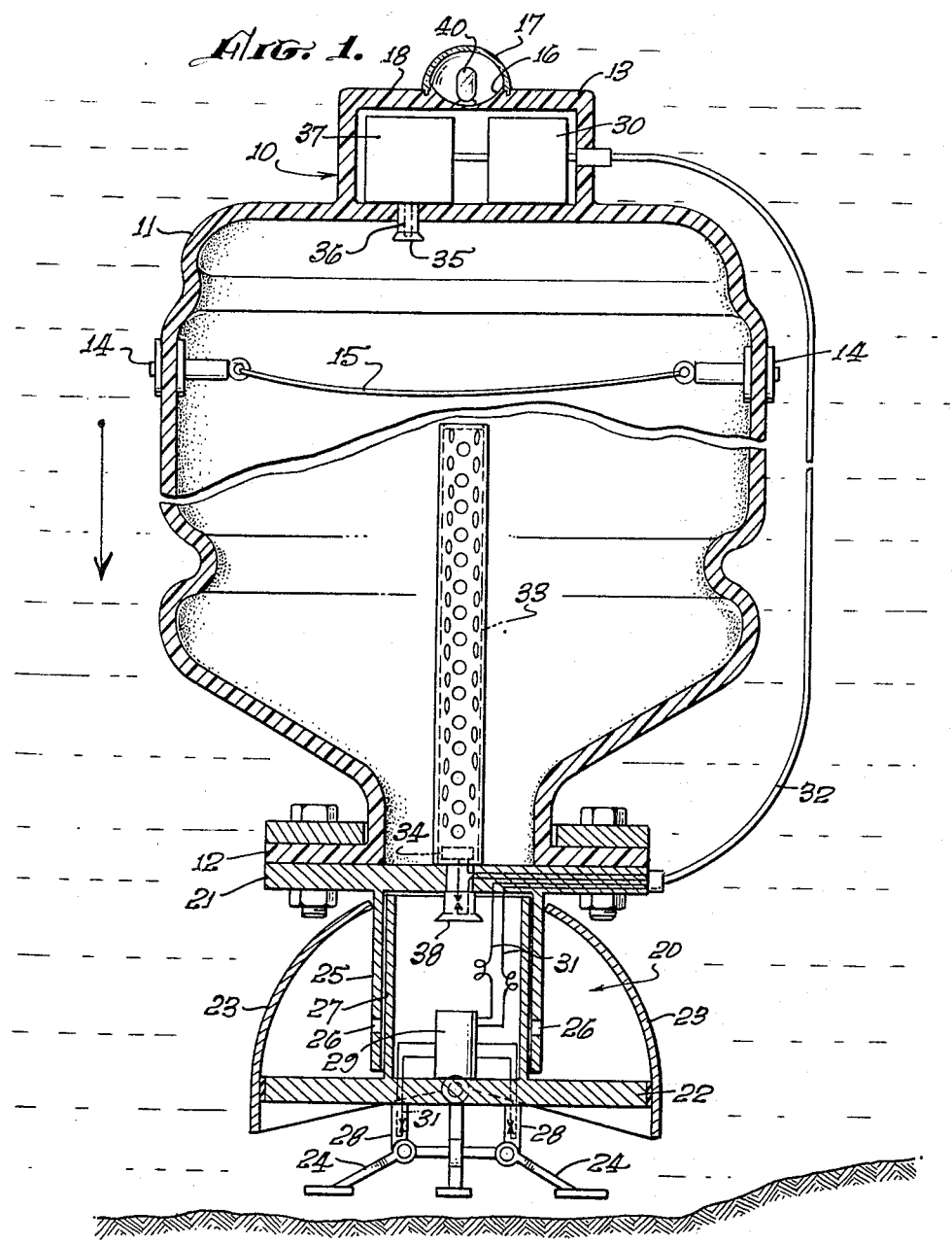

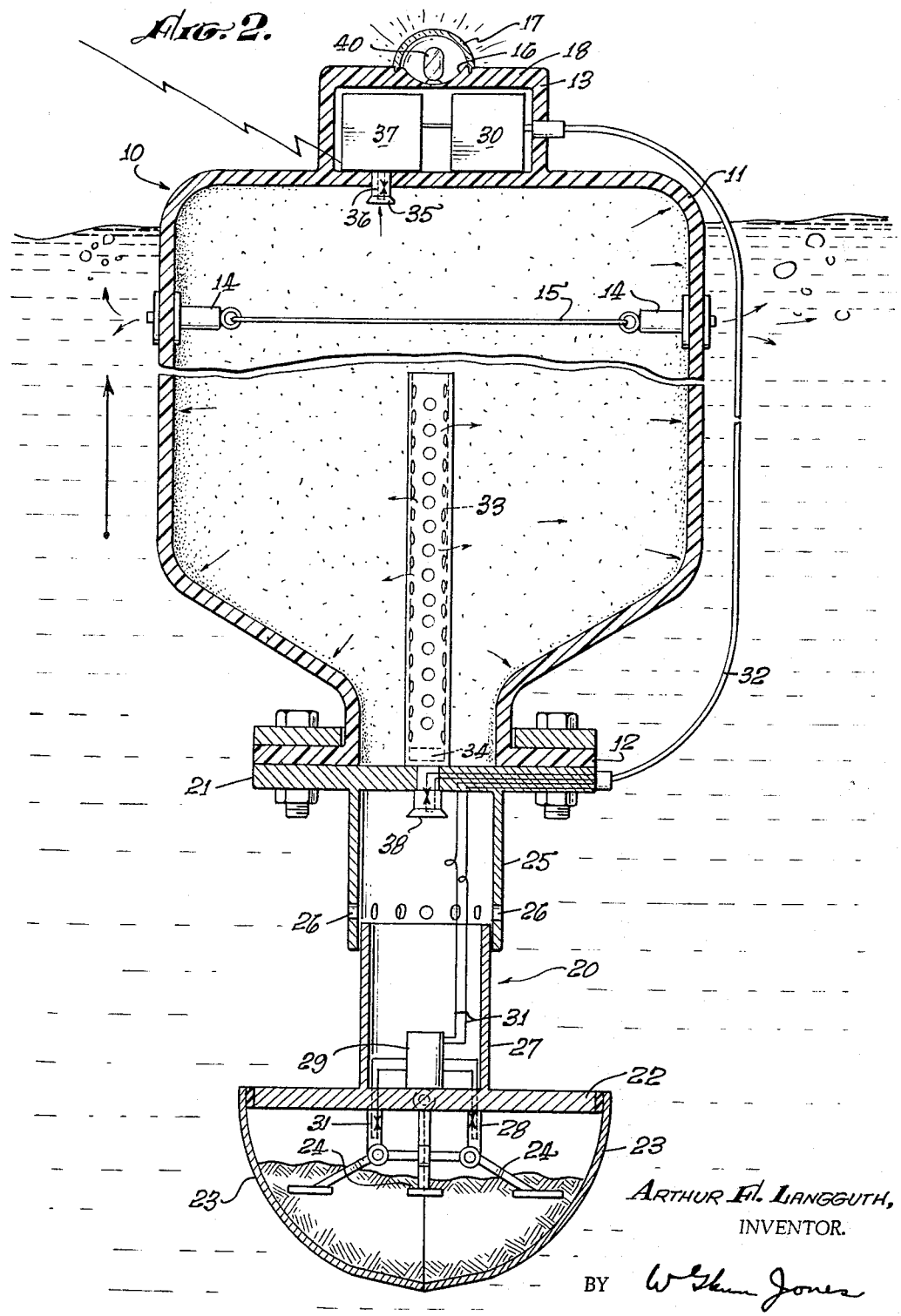

3,280,633
DEEP OCEAN SAMPLER
Arthur F. Langguth, 2125 Thrush Ave., Oxnard, Calif.
Filed June 30, 1964, Ser. No. 379,419
5 Claims. (Cl. 73—421)

The invention described herein may be manufactured and used by or for the Government of the United States of America for governmental purposes without the payment of any royalties thereon and therefor.

This invention relates generally to deep ocean samplers and particularly to a type of ocean bottom sample retriever which is independent of lowering and hoisting apparatus and other controls.

The art of sounding the ocean bottom, i.e., the ascertaining of the depth of the water over the ocean bottom at any particular point with relation to the horizontal water surface, is as ancient as the beginning of navigation on the water surface. From its initial crude practice adjacent the shores of any large body of water, the art of sounding was extended to greater depths as the speed of surface navigation increased. The sounding leads were increased in size and weight and their handling apparatus aboard the ship or floating platform became more complex. The ability to sense depth, which might be the length of line paid out or a barometric type of chemically sensitive glass tube enclosed in the deep sea lead, was augmented later by the ability to pick up a sample of the ocean or lake botttom. As time passed, navigational charts indicated the types of bottom that might be found in certain charted locations so that the surface navigator was enabled to check his navigational location in conditions of fog or poor visibility when the usual aids to celestial navigation were unavailable.

In modern times, the increased activity in the science of oceanography, stimulated by man's enhanced desire to learn more about his "inner space" and its tremendous resources, has engendered an accelerated development in instrumentation designed to plumb the deepest depths as well as to ascertain and chart the newly discovered ocean currents, some of which seem as regularly established as the air currents found in high altitude aircraft operations. Greater interest is being shown, not only in the composition of the ocean's bottom, but in the forms of life existent thereon and therein. Improved forms of bottom samplers, corers, and current detecting units are being continuously produced. Many of these, which may be considered as outgrowths from the older forms of sounding leads have become comparatively tremendous in size and weight, requiring complicated handling, lowering, and hoisting apparatus supported by larger surface vessels which are still subject to surface weather conditions. These large vessels and barges sometimes have great difficulty in remaining on position to handle and monitor their submerged apparatus and instruments.

In order to obviate the many disadvantages outlined above possessed by such types of instruments currently in use, my invention relates to a deep ocean sampler which comprises a sampling unit, a return vehicle and a signalling unit. The sampler is provided with negative buoyancy and dropped over the side of the support vessel at a point on the surface over the desired location from which the sample of the ocean bottom is desired. Upon reaching the bottom, means are provided to procure the bottom sample and then to establish a condition of positive buoyancy enabling the sampler to rise to the surface. While rising, signalling means are actuated so that the device may be readily located when it surfaces. If desired, the signalling means may be caused to operate continuously from the time of immersion to the time of recovery thus enabling accurate plotting of the ocean currents in the area being surveyed.

The principal object of the invention, therefore, is to provide an automatically operating deep ocean sampler which, during its immersion in the ocean, is free of all lowering and hoisting cables and/or other control lines.

Another object of the invention is to provide a deep ocean sampler capable of operating at great depths and then automatically being returned to the surface for recovery.

A further object of the invention is to provide a deep ocean sampler possessing adequate automatically operating signalling means whereby recovery on its return to the surface may be facilitated or otherwise the location of the sampler may be determined throughout its free fall to the ocean floor and return to the surface.

Other objects, advantages and novel features of the invention will become apparent from the following detailed description of the invention when considered in conjunction with the accompanying drawings wherein:

FIGURE 1 is a partly cross-sectional elevation of the sampler in the descending mode; and FIG. 2 is a similar view of the sampler in an ascending mode.

With reference to the figures, the deep ocean sampler 10 comprises an inflatable buoy or bag structure 11, a bottom sampling unit 20, and signalling means 30.

The buoy 11 which may be formed from rubber or other suitable flexible material is provided with a flanged neck opening 12 which may be suitably sealed to the bottom sampling unit 20. An hermetically sealed compartment 13 is formed in the upper portion of the bag structure 11 for the reception of certain portions of the signalling equipment. A circular depression 16 surmounted by a clear plastic cover 17 may be formed in the upper horizontal wall 18 of compartment 13 for the reception of the signal light 40. Two diametrically opposed relief valves 14 are installed in the upper portion of the buoy. These valves 14 are connected by a lanyard or strap 15.

The bottom sampling unit 20 consists basically of an upper foundation plate 21, a lower plate 22, semi-spherical clam shell jaws 23, and finger switch contacts 24.

Depending vertically from the lower surface of the upper foundation plate 21 is the hollow cylinder 25. This cylinder may be formed integrally with the plate or may be formed of tubing and suitably secured to the plate. A horizontal row of ports 26 is provided in the lower portion of this cylinder 25.

Extending upwardly from lower plate 22 and fitting closely inside the bore of the hollow cylinder 25 is another hollow cylinder 27. This latter cylinder 27 may be formed as described in connection with cylinder 25.

Depending vertically from lower plate 22 are hollow supports 28 for the pivoted connections of the finger switch contacts 24. These latter may be three in number and contact switches are contained in the pivoted connections such that, when the fingers 24 touch the ocean bottom, they are forced upwardly closing the normally open switches to complete an electrical circuit to the explosive charge 29. As shown, connection wires 31 lead upwardly through the hollow supports 28, through plate 22 into the charge 29 and then through an axial aperture in upper foundation plate 21 to the external cable connection 32 which in turn leads to small batteries encased in compartment 13. The casing of explosive charge 29 is detachably secured to the upper surface of plate 22 so that it may be easily replaced with a fresh charge.

Immediately above charge 29 and substantially concentric therewith, is mounted a pressure operated switch 38. As shown, this switch is mounted on the lower surface of foundation plate 21 with electrical connection leads leading upwardly through this plate 21 into the base of a progressively slow burning charge 33. These electrical connection leads connect an igniter 34 in the base of the slow burning charge 33 with the electrical batteries in compartment 13. Extra leads in cable 32 may be utilized for this purpose.

While not shown in detail, clam shell jaws 23 may be pivotally connected to plates 21 and 22 and cylinders 25 and 27 by over center or toggle linkages well known in the prior art. Toggle linkages are indicated for forcing the clam shell jaws into the bottom sediment or material while an over center arrangement is required to keep the clam shell jaws closed during the ascent of the sampler to the surface.

The signalling means 30 include the pressure operated switch 35 installed in the upper portion of the buoy bag 11 with its electrical leads 36 leading into the radio transmitter 37. These leads 36 may also be utilized to actuate the signal light 40.

In operation, the air evacuated bag structure 11 is secured to foundation plate 21. In the smaller sizes, this evacuation may be accomplished simply by squeezing the bag as it is installed. In larger sizes, an evacuation fitting (not shown) could be installed in the wall of the bag for connection to a vacuum pump line. However accomplished, sufficient air must be eliminated from the bag structure so that the sampler will have an overall negative buoyancy. The sampler is then placed over the side of the support vessel into the ocean whereupon it sinks down through the depths until it contacts the bottom with the finger switches 24. As these finger switches are rotated upwardly about their pivots in supports 28, the switches contained therein are closed and the explosive charge 29 is set off. The resulting gases force the two cylinders 25 and 27 apart thereby actuating the toggle and over center linkages to force the clam shell jaws downwardly into the ocean bottom and thus procure a sample thereof. As illustrated in FIG. 2, when cylinder 27 reaches the designed limit of its travel, ports 26 are opened or uncovered and the expanding gases are discharged.

During the initial phases of the gas discharge from the explosive charge 29 and as pressure is being built up in the space defined by the telescoping cylinders 25 and 27, pressure switch 38 is actuated and igniter 34, which incorporates a time delay fuse of say 10 seconds, is fired thus initiating the slow discharge of gases from the slow burning charge 33. As the gases from this latter charge fill the interior of the buoy bag 11, positive buoyancy of the sampler is established and it commences its rise to the surface. As the pressure builds up in the bag, pressure switch 35 is actuated so as to turn on the radio transmitter 37 and signal light 40. The positive buoyancy thus provided is sufficient to raise sealed compartment 13 above the surface of the body of water supporting the sampler so that the transmitter may have maximum range and the signal light be clearly discernible.

As the sampler rises into areas of reduced external water pressure and the buoy bag continues to distend under the influence of the internal pressure, lanyard 15 becomes taut and, as the bag continues to distend, finally causes relief valves 14 to be opened thereby releasing the excess internal pressure and preventing the flexible buoy bag from rupturing.

Upon recovery by the supporting surface vessel, the bag structure 11 may be quickly removed from the sampling unit 20 and reinstalled on another unit having fresh charges 29 and 33. The bottom sample may then be removed from the sampling unit and the latter is recharged for further immediate use when a buoy bag is available.

While the structures 25 and 27 have been described as hollow cylinders, they may, of course, be of any corresponding cross section such as square, rectangular or any other desired shape. The radio transmitter may be replaced with a sonar or sound pulsing device which would enable the deep ocean sampler to be traced and located by sonar appaartus.

Obviously many other modifications and variations of the present invention are possible in the light of the above teachings. It is therefore to be understood that within the scope of the appended claims the invention may be practiced otherwise than as specifically described.

I claim:
1. A deep water sampler adapted for free fall and rise to and from the bottom of a body of water to the horizontal surface thereof comprising, in combination
    a sampling unit adapted to forcibly obtain a sample of said bottom, said sampling unit possessing clam shell jaws pivotally secured thereto, said jaws being adapted to forcibly penetrate the surface of said bottom and obtain a sample thereof when said sampler contacts said bottom;
    an inflatable flexible bag structure secured to the upper portion of said sampling unit;
    means to inflate said flexible bag structure after the contact of said sampler with said bottom; and
    signalling means carried in the upper portion of said bag structure adapted to be energized after said sampler has contacted said bottom.

2. A deep water sampler as claimed in claim 1 further characterized by said sampling unit being fitted with an explosive charge adapted to be activated when said sampler contacts said bottom, said explosive charge being further adapted to force said clam shell jaws to penetrate the surface of said bottom.

3. A deep water sampler as claimed in claim 2 further characterized by said sampling unit being fitted with rotatable finger switch contacts adapted to energize said explosive charge when said sampler contacts said bottom.

4. A deep water sampler as claimed in claim 2 further characterized by having a source of electrical power carried in the upper portion of said inflatable flexible bag structure, circuitry connecting said source of electrical power to said means to inflate said bag structure and a normally open pressure switch included in said circuitry, said pressure switch being adapted to be closed by the pressure created by said explosive charge.

5. A deep water sampler adapted for free fall and rise to and from the bottom of a body of water to the horizontal surface thereof comprising, in combination:
    a sampling unit adapted to forcibly obtain a sample of said bottom when said sampler contacts said bottom;
    an inflatable flexible bag structure secured to the upper portion of said sampling unit;
    means to inflate said flexible bag structure after the contact of said sampler with said bottom comprising a slow-burning gas producing charge carried by said sampling unit, said slow-burning charge being adapted to be activated with a short predetermined time delay after said sampler has contacted said bottom;
    signalling means carried in the upper portion of said bag structure adapted to be energized after said sampler has contacted said bottom; and a source of electrical power carried in the upper portion of said inflatable flexible bag structure, circuitry connecting said source of electrical power to said signalling means, and a normally open pressure switch included in said circuitry, said pressure switch being adapted to be closed by the gas pressure created in said bag structure by said slow-burning gas producing charge.

References Cited by the Examiner

UNITED STATES PATENTS

| | | | |
|---|---|---|---|
| 2,798,378 | 7/1957 | Del Raso et al. | 73—421 X |
| 2,825,803 | 3/1958 | Newbrough | 9—9 X |
| 3,035,285 | 5/1962 | Squires | 116—124.9 |
| 3,094,928 | 6/1963 | Costley et al. | |

LOUIS R. PRINCE, *Primary Examiner.*

D. M. YASICH, *Assistant Examiner.*